United States Patent
Kang et al.

(10) Patent No.: US 6,952,400 B1
(45) Date of Patent: Oct. 4, 2005

(54) METHOD FOR RESTRICTING OVERFLOODING DUE TO ADDRESS REGISTRATION OF AN UNSTABLE ATM TERMINAL IN AN ATM SWITCH

(75) Inventors: Mun-Hyuk Kang, Seoul (KR); Byeong-Hee Roh, Seoul (KR); Hyun-Chul Ko, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 972 days.

(21) Appl. No.: 09/718,415

(22) Filed: Nov. 24, 2000

(30) Foreign Application Priority Data

Nov. 24, 1999 (KR) ............................... 1999-52350

(51) Int. Cl.[7] ......................... H04J 12/26; H04L 12/28
(52) U.S. Cl. ................................. 370/230; 370/395.2
(58) Field of Search ............................... 370/242, 244, 370/252, 395.1–395.72

(56) References Cited

U.S. PATENT DOCUMENTS

| | | | |
|---|---|---|---|
| 5,761,192 A | 6/1998 | Hummel | |
| 5,796,736 A | 8/1998 | Suzuki | |
| 5,831,975 A | 11/1998 | Chen et al. | |
| 5,831,982 A | 11/1998 | Hummel | |
| 5,854,899 A | 12/1998 | Callon et al. | |
| 5,872,773 A | 2/1999 | Katzela et al. | |
| 5,963,555 A | 10/1999 | Takase et al. | |
| 6,002,674 A * | 12/1999 | Takei et al. | 370/254 |
| 6,028,863 A | 2/2000 | Sasagawa et al. | |
| 6,078,586 A | 6/2000 | Dugan et al. | |
| 6,111,881 A | 8/2000 | Soncodi | |
| 6,141,322 A | 10/2000 | Poretsky | |
| 6,212,164 B1 * | 4/2001 | Murakami et al. | 370/230 |
| 6,487,168 B1 * | 11/2002 | Hamami | 370/216 |
| 6,552,999 B2 * | 4/2003 | Iwase et al. | 370/230 |
| 6,563,811 B2 * | 5/2003 | Hansen et al. | 370/338 |
| 6,577,607 B1 * | 6/2003 | Mitts et al. | 370/310.1 |
| 6,724,756 B2 * | 4/2004 | Fourie et al. | 370/360 |

* cited by examiner

*Primary Examiner*—Hassan Kizou
*Assistant Examiner*—Hong Sol Cho
(74) *Attorney, Agent, or Firm*—Robert E. Bushnell, Esq.

(57) ABSTRACT

The method disclosed herein restricts overflooding due to address registration of an unstable asynchronous transfer mode (ATM) terminal through an interim local management interface (ILMI) protocol in an asynchronous transfer mode switch. The asynchronous transfer mode switch registers an address of the asynchronous transfer mode terminal using the interim local management interface protocol, and then determines whether the asynchronous transfer mode terminal is stable or not stable. When the asynchronous transfer mode terminal is not stable, the asynchronous transfer mode switch defers application of a private network-to-network interface (PNNI) until the asynchronous transfer mode terminal becomes stable.

20 Claims, 5 Drawing Sheets

| INDEX | TERMINAL'S ATM ADDRESS | LAST CONNECT TIME | LAST DISCONNECT TIME |

METHOD FOR RESTRICTING OVERFLOODING DUE TO ADDRESS REGISTRATION OF AN UNSTABLE ATM TERMINAL IN AN ATM SWITCH

CLAIM OF PRIORITY

This application claims priority to an application entitled "METHOD FOR RESTRICTING OVERFLOODING DUE TO ADDRESS REGISTRATION OF AN UNSTABLE ATM TERMINAL IN AN ATM SWITCH" filed in the Korean Industrial Property Office on Nov. 24, 1999 and assigned Serial No. 99-52350, the contents of which are hereby incorporated by reference.

BACKGROUND OF THE INVENTION

1. Technical Field

The present invention relates generally to a method for restricting overflooding due to address registration of an unstable asynchronous transfer mode (ATM) terminal in an asynchronous transfer mode switch.

2. Related Art

In general, asynchronous transfer mode (ATM) terminals connected to an asynchronous transfer mode switch are automatically assigned their asynchronous transfer mode addresses and register their asynchronous transfer mode addresses in the asynchronous transfer mode switch through an interim local management interface (ILMI) protocol. When the addresses of the asynchronous transfer mode terminals are completely registered in the asynchronous transfer mode switch, other ATM-related protocols such as user network interface (UNI), local area network emulation (LANE or LAN emulation) and private network-to-network interface (PNNI) are interconnected. If an asynchronous transfer mode terminal registers its address in the asynchronous transfer mode switch through the interim local management interface, the private network-to-network interface stores the address in its network topology database for private network-to-network interface routing.

The asynchronous transfer mode terminal repeatedly performs an operation of connecting with the asynchronous transfer mode switch through the interim local management interface to register the address and releasing, when the connection is cut off, the registered address and then reconnecting with the asynchronous transfer mode switch. Therefore, when an unstable asynchronous transfer mode terminal attempts to register its address in the asynchronous transfer mode switch through the interim local management interface, it is necessary to rebuild the private network-to-network interface topology database managed by the asynchronous transfer mode switch, each time the connection is made and cut off. The asynchronous transfer mode switch then regards this as a significant change and performs a synchronization process on every switch belonging to the same peer group through a flooding mechanism.

Such repeatedly performed flooding provides from time to time unstable database information to a network of the corresponding peer group, increasing the unstable factors of the overall network. Therefore, an increase in the network scale and the number of the terminals increases the possibility that unstable terminals will exist.

The present invention has found that overflooding due to address registration of an unstable asynchronous transfer mode terminal in an asynchronous transfer mode switch can be inconvenient and undesirable. Efforts have been made to improve networks in general and asynchronous transfer mode networks in particular.

Exemplars of recent efforts in the art include U.S. Pat. No. 6,028,863 to Sasagawa et al., entitled METHOD AND APPARATUS FOR NEGOTIATING CONNECTION IDENTIFIER, issued on Feb. 22, 2000, U.S. Pat. No. 6,111,881 to Soncodi, entitled SIGNALING PROTOCOL FOR REROUTING ATM CONNECTIONS IN PNNI ENVIRONMENTS, issued on Aug. 29, 2000, U.S. Pat. No. 6,141,322 to Poretsky, entitled METHOD AND APPARATUS FOR PRECEDENCE AND PREEMPTION IN ATM CONNECTION ADMISSION CONTROL, issued on Oct. 31, 2000, U.S. Pat. No. 6,078,586 to Dugan et al., entitled ATM VIRTUAL PRIVATE NETWORKS, issued on Jun. 20, 2000, U.S. Pat. No. 5,872,773 to Katzela et al., entitled VIRTUAL TREES ROUTING PROTOCOL FOR AN ATM-BASED MOBILE NETWORK, issued on Feb. 16, 1999, U.S. Pat. No. 5,963,555 to Takase et al., entitled ROUTER APPARATUS USING ATM SWITCH, issued on Oct. 5, 1999, U.S. Pat. No. 6,002,674 to Takei et al., entitled NETWORK CONTROL SYSTEM WHICH USES TWO TIMERS AND UPDATES ROUTING INFORMATION, issued on Dec. 14, 1999, U.S. Pat. No. 5,854,899 to Callon et al., entitled METHOD AND APPARATUS FOR MANAGING VIRTUAL CIRCUITS AND ROUTING PACKETS IN A NETWORK/SUBNETWORK ENVIRONMENT, issued on Dec. 29, 1998, U.S. Pat. No. 5,831,982 to Hummel, entitled METHOD FOR FORMING ROUTING INFORMATION IN AN ATM COMMUNICATION NETWORK, issued on Nov. 3, 1998, U.S. Pat. No. 5,796,736 to Suzuki, entitled ATM NETWORK TOPOLOGY AUTO DISCOVERY METHOD, issued on Aug. 18, 1998, U.S. Pat. No. 5,831,975 to Chen et al., entitled SYSTEM AND METHOD. FOR HIERARCHICAL MULTICAST ROUTING IN ATM NETWORKS, issued on Nov. 3, 1998, and U.S. Pat. No. 5,761,192 to Hummel, entitled METHOD AND ATM COMMUNICATION NETWORK FOR INTEGRATION OF AN ATM SWITCHING NODE TO BE CONFIGURED INTO AN ATM COMMUNICATION NETWORK, issued on Jun. 2, 1998.

While these recent efforts provide advantages, it is noted that they fail to adequately provide a convenient and efficient method for restricting overflooding due to address registration of an unstable asynchronous transfer mode terminal in an asynchronous transfer mode switch.

SUMMARY OF THE INVENTION

Therefore, it is an object of the present invention to provide a method for restricting overflooding due to address registration of an unstable asynchronous transfer mode terminal in an asynchronous transfer mode switch.

It is another object of the present invention to provide a method for restricting overflooding by reducing a network load by detecting an unstable terminal and preventing a factor causing occurrence of the significant change in an asynchronous transfer mode switch.

To achieve the above objects and others, there is provided a method for restricting overflooding on a private network-to-network interface (PNNI) in an asynchronous transfer mode (ATM) switch. The method comprises the steps of: registering an address of an asynchronous transfer mode terminal using an interim local management interface (ILMI) protocol and then determining whether the asynchronous transfer mode terminal is stable or not; and, when the asynchronous transfer mode terminal is unstable, deferring application of the private network-to-network interface until the asynchronous transfer mode terminal becomes stable.

Preferably, the asynchronous transfer mode terminal is determined to be unstable when a time value determined by subtracting a last connect time from a current time is less than a preset maximum tolerant time. Further, the private network-to-network interface protocol is applied when the asynchronous transfer mode terminal is determined to be stable.

To achieve these and other objects in accordance with the principles of the present invention, as embodied and broadly described, the present invention provides a method for controlling an asynchronous transfer mode switch, comprising: registering an address of an asynchronous transfer mode terminal using an interim local management interface protocol and determining when said asynchronous transfer mode terminal is stable; and when said asynchronous transfer mode terminal is not stable, not applying a private network-to-network interface protocol in said asynchronous transfer mode switch.

To achieve these and other objects in accordance with the principles of the present invention, as embodied and broadly described, the present invention provides a method for restricting overflooding in an asynchronous transfer mode switch, comprising: when registering an address of an asynchronous transfer mode terminal through an interim local management interface protocol, determining when there is an address of said asynchronous transfer mode terminal in a data table for an unstable terminal; registering a current time in a last connect time field in an entry of said table when there is an address of said asynchronous transfer mode terminal registered in said data table; comparing a time value determined by subtracting a last connect time from a current time with a preset maximum tolerant time to determine when said asynchronous transfer mode terminal is stable; and, when said asynchronous transfer mode terminal is not stable, not applying private network-to-network interface.

To achieve these and other objects in accordance with the principles of the present invention, as embodied and broadly described, the present invention provides a method of controlling an asynchronous transfer mode switch, comprising: detecting whether an asynchronous transfer mode address corresponding to an asynchronous transfer mode terminal is stored in a data table, said data table including a plurality of address fields and last connect time fields, each one of said address fields corresponding to a respective one of said last connect time fields; when said asynchronous transfer mode address is not detected as being stored in said data table, creating a new entry in said data table corresponding to said asynchronous transfer mode terminal, said new entry having a new address field and a new last connect time field, setting said new address field in accordance with said asynchronous transfer mode address, setting said new last connect time field in accordance with a current time; when said asynchronous transfer mode address is detected as being stored in said data table, updating an existing last connect time field in accordance with a current time, said existing last connect time field corresponding to said asynchronous transfer mode address; determining whether a time value is larger than a predetermined maximum tolerant time, said time value being equal to a first value subtracted from a second value, said first value being stored in an identified last connect time field, said second value corresponding to a current time, said identified last connect time field being stored in said data table and corresponding to said asynchronous transfer mode address; and when said time value is not larger than said predetermined maximum tolerant time, not applying a private network-to-network interface protocol in said asynchronous transfer mode switch.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE PREFERRED EMBODIMENT

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention. In the following description, well-known functions or constructions are not described in detail since they would obscure the invention in unnecessary detail.

Figure 1:
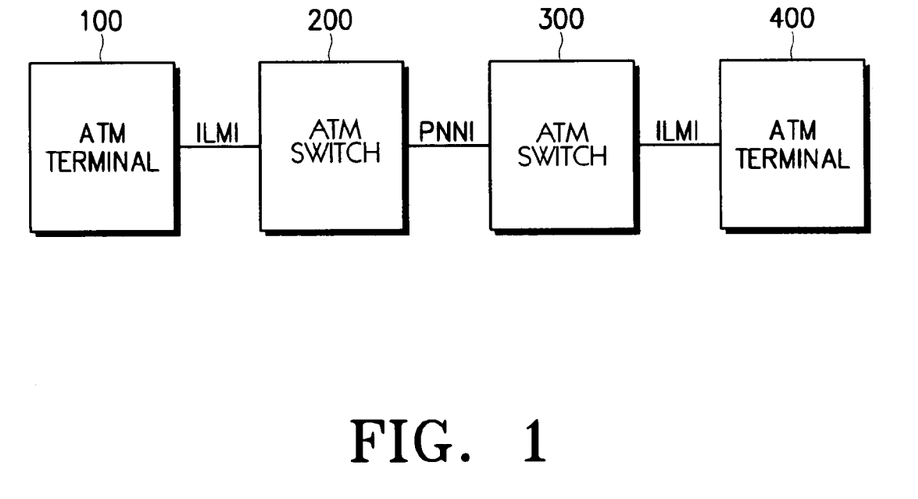
FIG. 1 is a diagram illustrating the structure of an asynchronous transfer mode (ATM) switch network in accordance with the principles of the present invention.

FIG. 1 illustrates the structure of an asynchronous transfer mode (ATM) switch network according an embodiment of the present invention. Referring to FIG. 1, first and second asynchronous transfer mode (ATM) terminals 100 and 400 are connected to first and second asynchronous transfer mode switchs 200 and 300, respectively, through associated interim local management interface (ILMI), respectively. Further, the first asynchronous transfer mode switch 200 is connected to the second asynchronous transfer mode switch 300 through a private network-to-network interface (PNNI).

Figure 2:
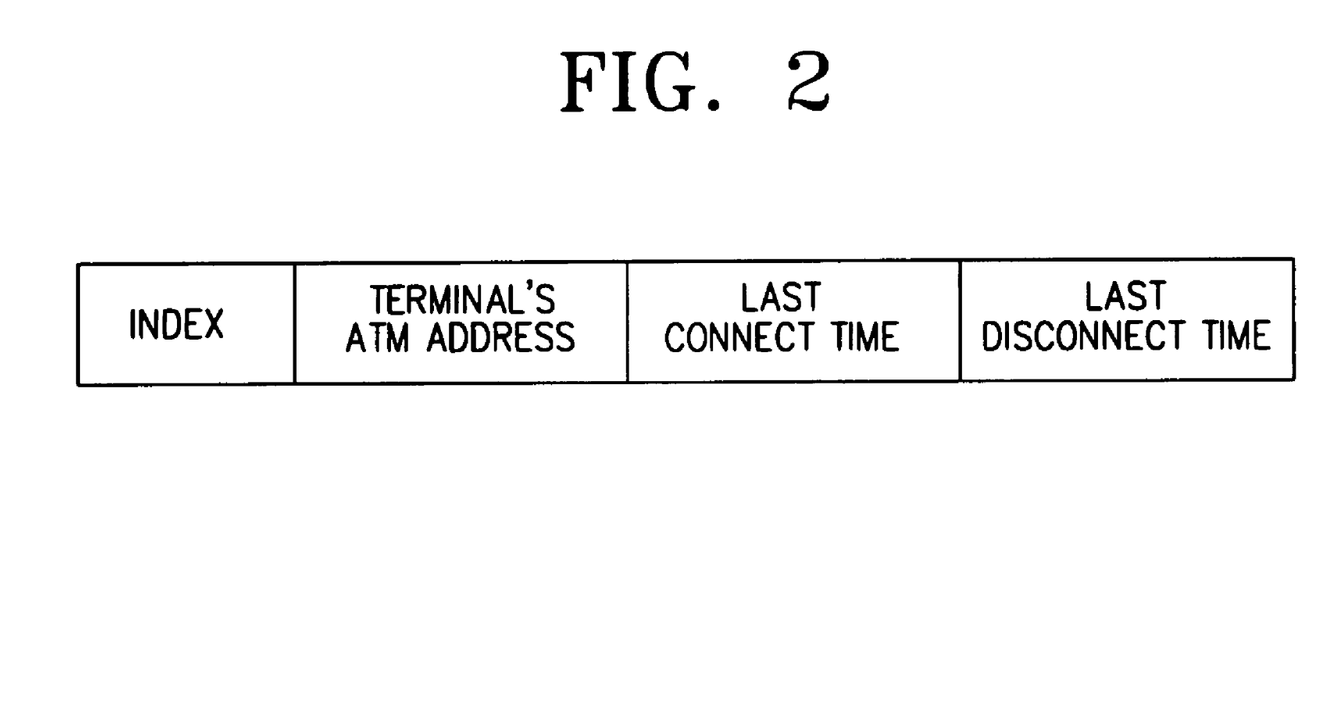
FIG. 2 is a diagram illustrating a table data structure of an unstable terminal, in accordance with the principles of the present invention.

FIG. 2 is a diagram illustrating a table data structure of an unstable terminal according to an embodiment of the present invention. Referring to FIG. 2, the table data structure includes a table index, a terminal's asynchronous transfer mode (ATM) address, a last connect time of the asynchronous transfer mode terminal, and a last disconnect time of the asynchronous transfer mode terminal.

Figure 3:
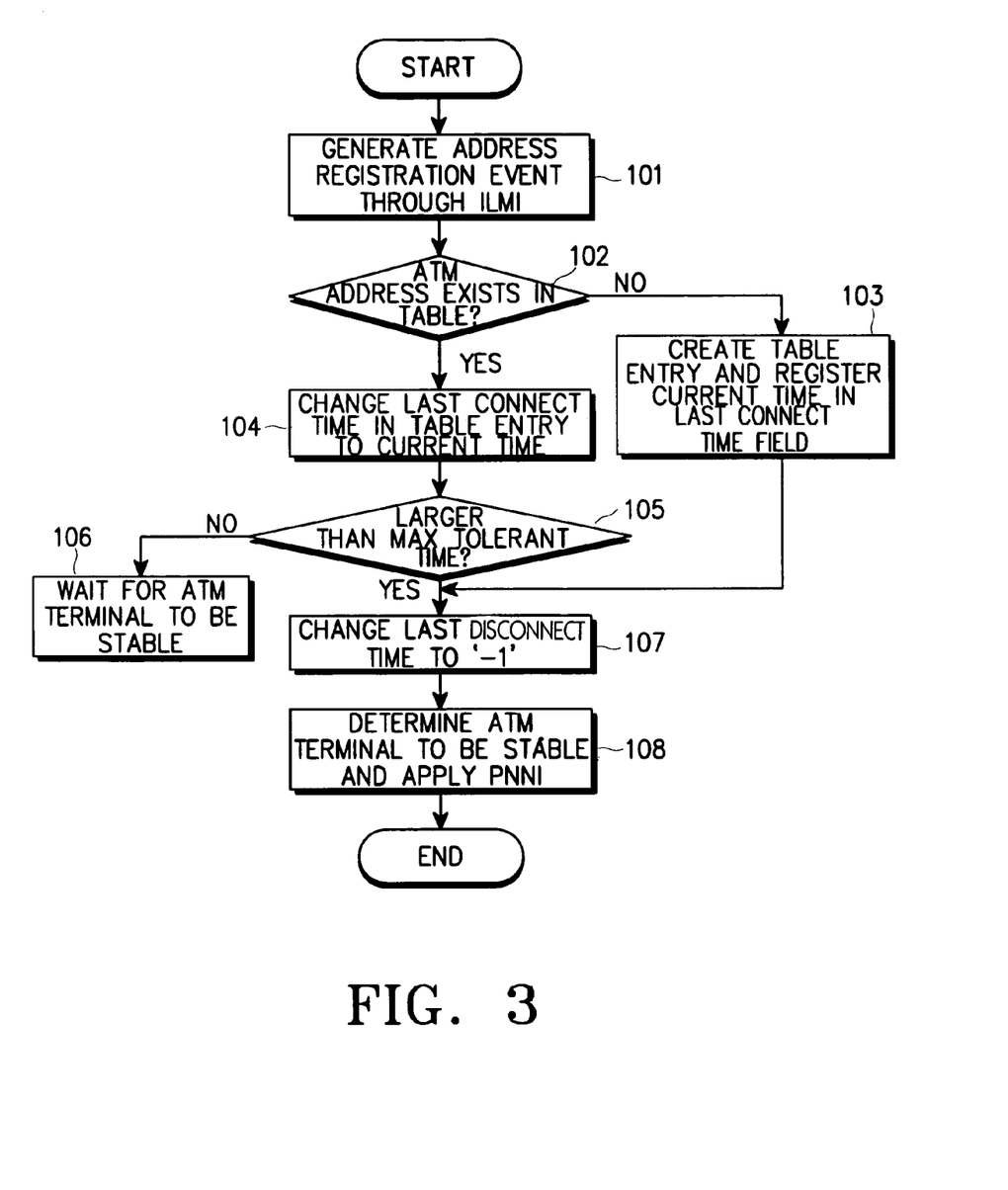
FIG. 3 is a flow chart illustrating a procedure for restricting overflooding of an unstable asynchronous transfer mode (ATM) terminal during address registration of an asynchronous transfer mode terminal through interim local management interface (ILMI), in accordance with the principles of the present invention.

FIG. 3 is a flowchart illustrating a procedure for restricting overflooding of an unstable asynchronous transfer mode terminal during address registration of an asynchronous transfer mode terminal through interim local management interface (ILMI) according to an embodiment of the present invention.

Operation of a preferred embodiment will be described with reference to FIGS. 1 to 3. At step 101, an address registration event of an asynchronous transfer mode (ATM) terminal is generated from the asynchronous transfer mode terminal through an interim local management interface (ILMI). An example of an address registration event is as follows. When an ATM terminal is connected to an ATM switch through the ILMI protocol, an address of the ATM terminal, for example an internet protocol (IP) address, is required to be registered with the ATM switch.

At step 102, the asynchronous transfer mode switch determines whether an address of the asynchronous transfer mode terminal is registered in the table. Step 103 is performed after step 102 when no address of the asynchronous transfer mode terminal is registered in the table. Step 104 is performed after step 102 when an address of the asynchronous transfer mode terminal is registered in the table.

At step 103, a table entry is created and the current time is placed in the last connect time field. At step 104, when an address of the asynchronous transfer mode terminal is registered in the table, the asynchronous transfer mode switch creates an entry in the table in the form as depicted in FIG. 2, and changes the last connect time in the created entry to the current time. That is, the asynchronous transfer mode switch registers the current time in the last connect time field of the table entry.

At step 105, the asynchronous transfer mode switch determines whether a time value determined by subtracting the last disconnect time from the current time is larger than a preset maximum tolerant time. The time value is equal to the current time minus the last disconnect time. If the time value is larger than the preset maximum tolerant time, this fact indicates that the asynchronous transfer mode terminal is stable. Alternatively, if the time value is smaller than the preset maximum tolerant time, this fact indicates that the asynchronous transfer mode terminal is not stable. The preset maximum tolerant time is a fixed reference value.

Step 107 is performed after step 103 is performed. Furthermore, step 107 is performed after step 105 is performed if the time value is larger than the preset maximum tolerant time. At step 107, the asynchronous transfer mode switch changes the last disconnect time to "−1". At step 108, the asynchronous transfer mode switch determines that the asynchronous transfer mode terminal is a stable terminal and applies a private network-to-network interface module.

Step 106 is performed after step 105 is performed if it is determined in step 105 that the time value determined by subtracting the last disconnect time from the current time is not larger than the preset maximum tolerant time. At step 106, the asynchronous transfer mode switch determines that the asynchronous transfer mode terminal, which has requested address registration, is an unstable asynchronous transfer mode terminal and waits for the asynchronous transfer mode terminal to be stable.

Figure 4:
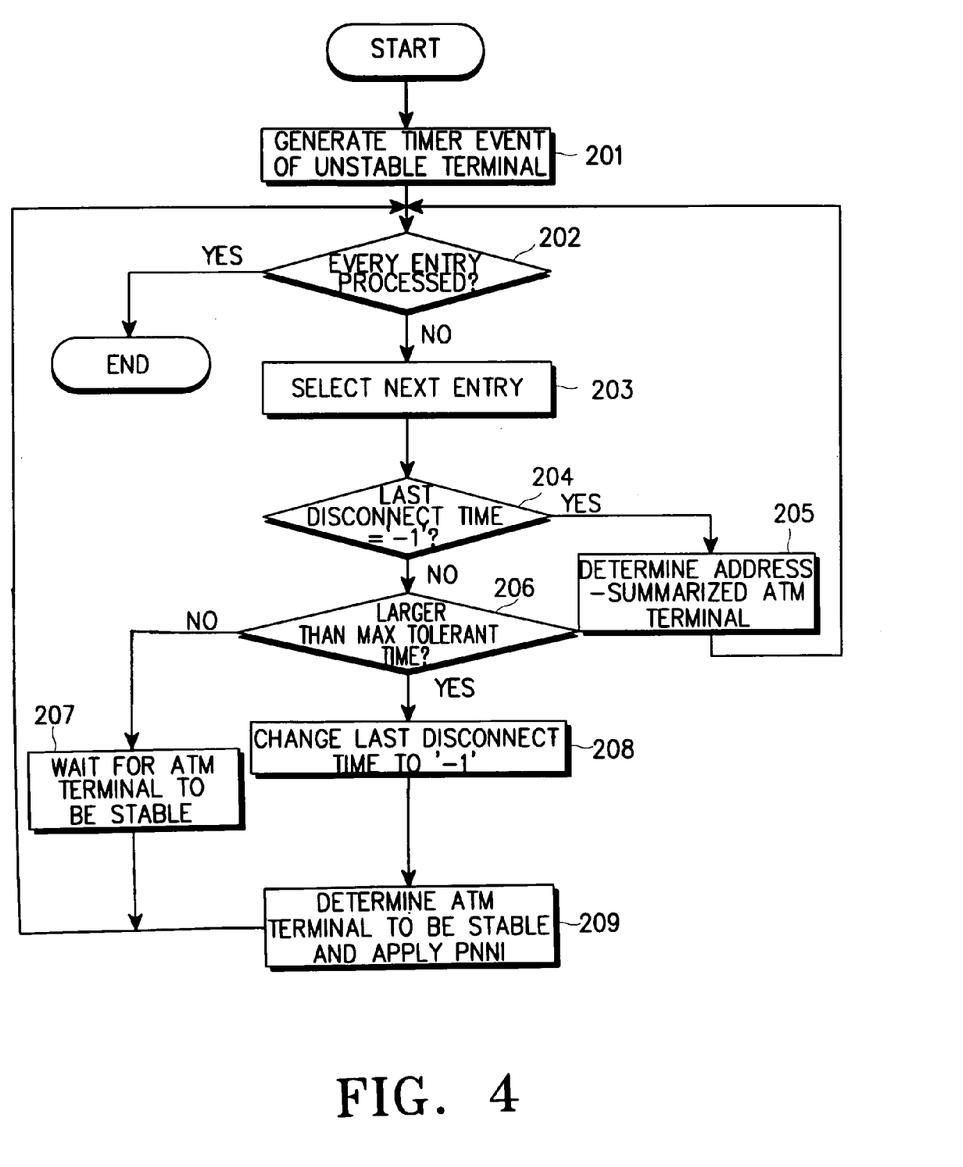
FIG. 4 is a flow chart illustrating a procedure for processing a timer event of an unstable asynchronous transfer mode (ATM) terminal, in accordance with the principles of the present invention.

If a timer event of the unstable asynchronous transfer mode terminal is generated during the waiting period, the procedure of FIG. 4 will be performed. The timer event is an activity wherein the activated timer is terminated when the ATM terminal is connected to the ATM switch through the ILMI protocol. Referring to FIG. 4, when a timer event of the unstable asynchronous transfer mode terminal is generated in step 201, the asynchronous transfer mode switch determines in step 202 whether every entry of the table shown in FIG. 2 has been processed. If every entry has been processed, the asynchronous transfer mode switch ends the operation. Conversely, if every entry has not been processed, the asynchronous transfer mode switch selects a next entry in the table in step 203 and then proceeds to step 204. In step 204, the asynchronous transfer mode switch determines whether the last disconnect time is "−1". If the last disconnect time is "−1", the asynchronous transfer mode switch determines that the asynchronous transfer mode terminal is an address-summarized asynchronous transfer mode terminal in step 205 and then returns to step 202. Conversely, if the last disconnect time is not "−1", the asynchronous transfer mode switch determines in step 206 whether a time value determined by subtracting the last disconnect time from the current time is larger than a preset maximum tolerant time. The preset maximum tolerant time is a fixed reference value. If the time value is larger than the maximum tolerant time, the asynchronous transfer mode switch changes the last disconnect time to "−1" in step 208.

Subsequently, the asynchronous transfer mode switch determines that the asynchronous transfer mode terminal is a stable asynchronous transfer mode terminal, and applies the private network-to-network interface (PNNI) module, in step 209. However, if it is determined in step 206 that the time value determined by subtracting the last disconnect time from the current time is not larger than the maximum tolerant time, the asynchronous transfer mode switch determines that the asynchronous transfer mode terminal associated with the presently selected entry is an unstable terminal, and waits for the asynchronous transfer mode terminal to be stable, in step 207. The asynchronous transfer mode terminal is determined to be an unstable terminal when the time set from the last connect time registered in the table for the unstable terminal has not elapsed and the address of the asynchronous transfer mode terminal has been registered. The maximum tolerant time of step 105 in FIG. 3 can be the same as the maximum tolerant time of step 206 of FIG. 4.

Figure 5:
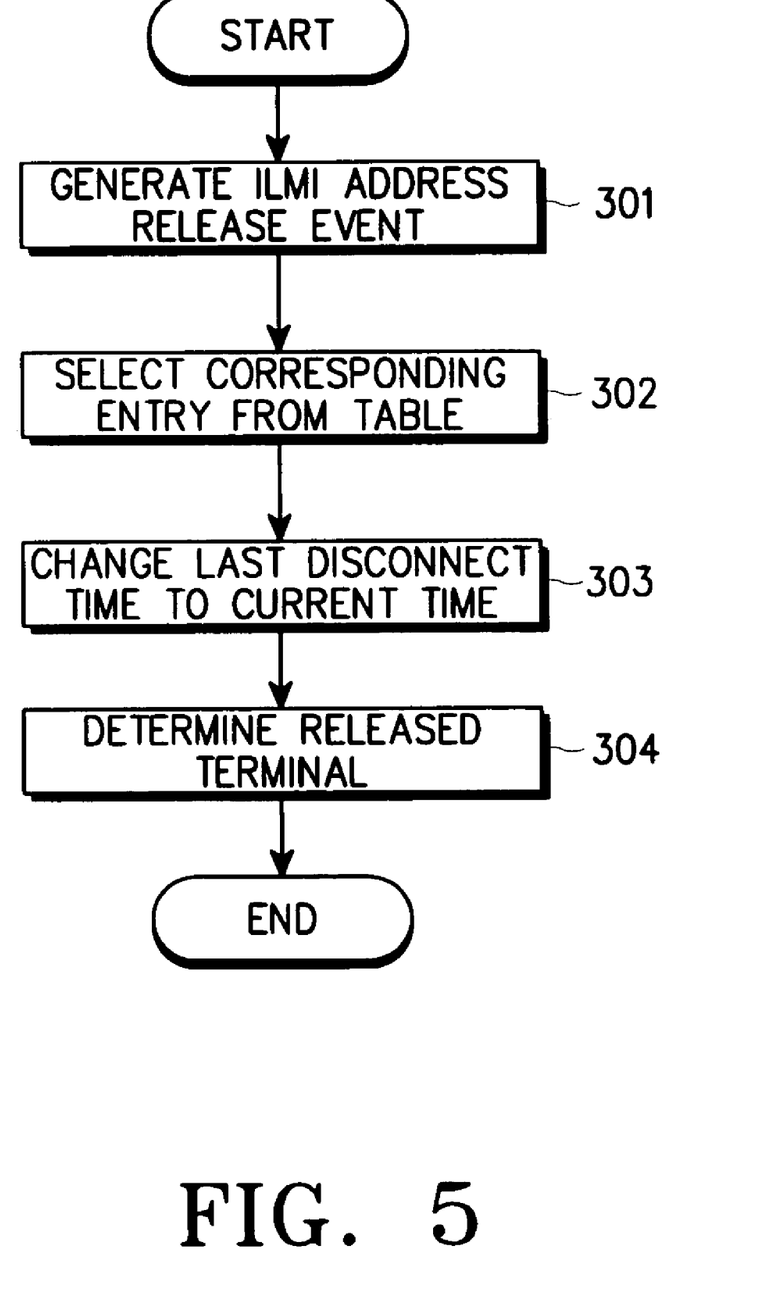
FIG. 5 is a flow chart illustrating a procedure for determining a released state of an asynchronous transfer mode (ATM) terminal upon occurrence of an interim local management interface (ILMI) address release event, in accordance with the principles of the present invention.

FIG. 5 is a flowchart which illustrates a procedure for determining a released state of an asynchronous transfer mode terminal upon occurrence of an interim local management interface (ILMI) address release event according to an embodiment of the present invention. The ILMI address release event is an activity involving termination of the connection between the ATM terminal and the ATM switch through the ILMI protocol. The released state can also be referred to as a disconnect state. Referring to FIG. 5, when an interim local management interface address release event is generated by the asynchronous transfer mode terminal in step 301, the asynchronous transfer mode switch selects an entry corresponding to the interim local management interface address from the table in step 302, and changes the last disconnect time to the current time in step 303. Thereafter, in step 304, the asynchronous transfer mode switch determines that the asynchronous transfer mode terminal, which has generated the interim local management interface address release event, is a terminal in a released state. The released state can also be described as a disconnect state.

As described above, the invention detects an unstable asynchronous transfer mode (ATM) terminal before the asynchronous transfer mode address is registered in the asynchronous transfer mode switch through the interim local management interface (ILMI), and defers applying it to the private network-to-network interface (PNNI) module until the asynchronous transfer mode terminal becomes stable, thereby preventing overload due to overflooding of the asynchronous transfer mode switch.

The foregoing paragraphs describe the details of a method for restricting overflooding due to address registration of an unstable asynchronous transfer mode (ATM) terminal in an asynchronous transfer mode switch, and in particular, the details of a method for restricting overflooding due to address registration of an unstable asynchronous transfer mode terminal through an interim local management interface (ILMI) protocol in an asynchronous transfer mode switch.

While the present invention has been illustrated by the description of embodiments thereof, and while the embodiments have been described in considerable detail, it is not the intention of the inventor to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the general inventive concept.

What is claimed is:

1. A method for controlling an asynchronous transfer mode switch, comprising the steps of:
    registering an address of an asynchronous transfer mode terminal using an interim local management interface protocol;
    determining when said asynchronous transfer mode terminal is stable by subtracting a last disconnect time from a current time to obtain a time value, and comparing the time value to a preset maximum tolerant time; and
    when said asynchronous transfer mode terminal is determined to be not stable, not applying a private network-to-network interface protocol in said asynchronous transfer mode switch.

2. The method of claim 1, said method for controlling said asynchronous transfer mode switch comprising a method for restricting overflooding on said private network-to-network interface in said asynchronous transfer mode switch.

3. The method of claim 1, further comprising the step, when said asynchronous transfer mode terminal is determined to be stable, of applying said private network-to-network interface protocol.

4. The method of claim 1, further comprising the step of:
    when said time value is not longer than said preset maximum tolerant time, determining that said asynchronous transfer mode terminal is not stable.

5. A method for restricting overflooding in an asynchronous transfer mode switch, comprising the steps of:
    when registering an address of an asynchronous transfer mode terminal using an interim local management interface protocol, determining when a data table indicates that said asynchronous transfer mode terminal is not stable;
    when there is an address of said asynchronous transfer mode terminal registered in said data table, registering a current time in a last connect time field of said data table;
    comparing a first time value, determined by subtracting a last disconnect time from a current time, with a second time value, said second time value corresponding to a preset maximum tolerant time, said comparing being performed to identify when said asynchronous transfer mode terminal is stable; and
    when said asynchronous transfer mode terminal is not stable, not applying a private network-to-network interface protocol.

6. The method of claim 5, further comprising the step, when said first time value is less than said second time value, of determining that said asynchronous transfer mode terminal is not stable.

7. The method of claim 5, further comprising the step of applying said private network-to-network interface protocol when said asynchronous transfer mode terminal is determined to be stable.

8. The method of claim 5, further comprising the steps of:
    when a timer event is generated, selecting a predetermined entry in said data table to determine when said selected asynchronous transfer mode terminal is stable, said timer event comprising detecting that said asynchronous transfer mode terminal is not stable; and
    applying a private network-to-network interface protocol when said asynchronous transfer mode terminal becomes stable.

9. A method of controlling an asynchronous transfer mode switch, comprising the steps of:
    detecting whether an asynchronous transfer mode address corresponding to an asynchronous transfer mode terminal is stored in a data table, said data table including a plurality of address fields, last connect time fields, and last disconnect time fields, each one of said address fields corresponding to a respective one of said last connect time fields and a respective one of said last disconnect time fields;
    when said asynchronous transfer mode address is not detected as being stored in said data table, creating a new entry in said data table corresponding to said asynchronous transfer mode terminal, said new entry having a new address field, a new last connect time field, and a new last disconnect time field, said new address field being set in accordance with said asynchronous transfer mode address, said new last connect time field being set in accordance with a current time;
    when said asynchronous transfer mode address is detected as being stored in said data table, updating an existing last connect time field in accordance with a current time, said existing last connect time field corresponding to said asynchronous transfer mode address;
    determining whether a time value is larger than a predetermined maximum tolerant time, said time value being equal to a first value subtracted from a second value, said first value being stored in an identified last disconnect time field, said second value corresponding to a current time, said identified last disconnect time field being stored in said data table and corresponding to said asynchronous transfer mode address; and
    when said time value is not larger than said predetermined maximum tolerant time, not applying a private network-to-network interface protocol in said asynchronous transfer mode switch.

10. The method of claim 9, further comprising the step of:
    when said time value is larger than said predetermined maximum tolerant time, updating said identified last disconnect time field to be equal to a predetermined value, and applying a private network-to-network interface protocol in said asynchronous transfer mode switch.

11. The method of claim 10, further comprising the step of identifying said existing last connect time field corresponding to said asynchronous transfer mode address.

12. The method of claim 10, said identified last connect time field being selected from among said new last connect time field and said updated existing last connect time field.

13. The method of claim 12, further comprising the step of:
when said time value is not larger than said predetermined maximum tolerant time, detecting that said asynchronous transfer mode terminal is not stable.

14. The method of claim 13, further comprising the step of:
when said time value is larger than said predetermined maximum tolerant time, detecting that said asynchronous transfer mode terminal is stable.

15. The method of claim 14, further comprising the step of:
registering an address corresponding to said asynchronous transfer mode terminal using an interim local management interface protocol.

16. The method of claim 9, further comprising the step of registering an address corresponding to said asynchronous transfer mode terminal using an interim local management interface protocol.

17. The method of claim 16, further comprising the step of:
when said time value is larger than said predetermined maximum tolerant time, updating said identified last disconnect time field to be equal to a predetermined value, and applying a private network-to-network interface protocol in said asynchronous transfer mode switch.

18. The method of claim 9, said identified last connect time field being selected from among said new last connect time field and said updated existing last connect time field.

19. The method of claim 9, further comprising the step of:
when said time value is not larger than said predetermined maximum tolerant time, waiting for said asynchronous transfer mode terminal to become stable, and not updating said identified last connect time field to be equal to a predetermined value.

20. The method of claim 9, further comprising the step of:
when said time value is larger than said predetermined maximum tolerant time, applying a private network-to-network interface protocol in said asynchronous transfer mode switch.

* * * * *